P. MELBERT.
COMPOUND IMPLEMENT.
No. 181,532.  Patented Aug. 29, 1876.
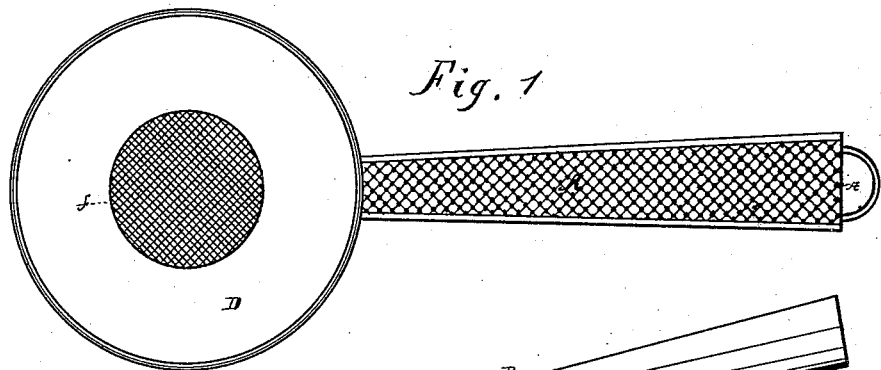
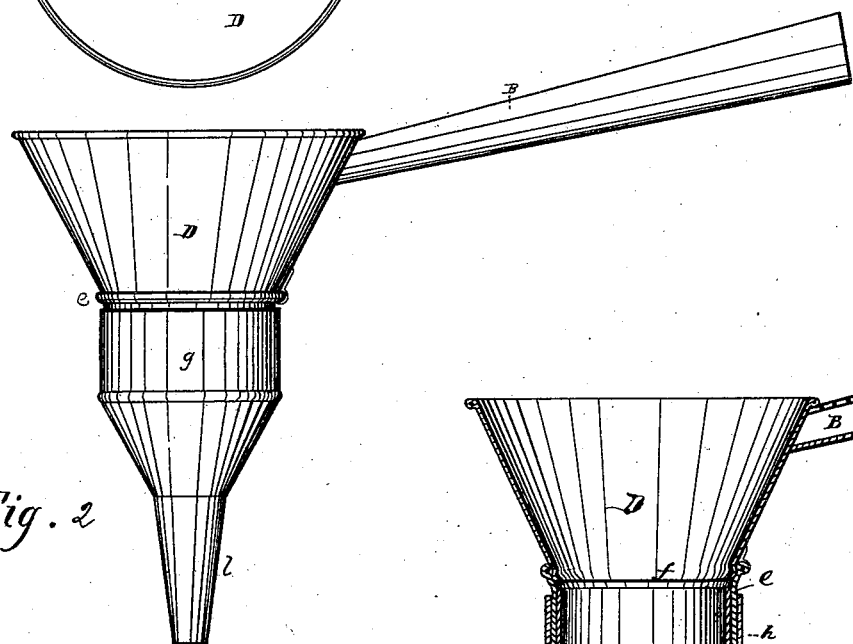
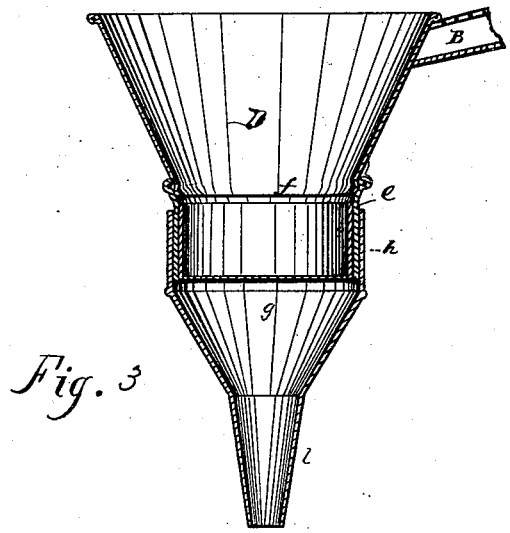

UNITED STATES PATENT OFFICE.

PETER MELBERT, OF PITTSBURG, PENNSYLVANIA.

IMPROVEMENT IN COMPOUND IMPLEMENTS.

Specification forming part of Letters Patent No. 181,532, dated August 29, 1876; application filed July 19, 1876.

*To all whom it may concern:*

Be it known that I, PETER MELBERT, of Pittsburg, in the county of Allegheny and State of Pennsylvania, have invented a new and useful Improvement in Household Utensil; and I do hereby declare that the following is a full and exact description thereof, reference being had to the accompanying drawings, and to the letters of reference marked thereon.

My invention relates to an improvement in household utensils; and it consists of a nutmeg-grater having a receptacle for the nutmeg, and serving as the handle to the can-filler and strainer, all as will be hereinafter more fully described.

To enable others skilled in the art to make and use my invention, I will proceed to describe its construction and operation.

In the accompanying drawings, which form part of my specification, Figure 1 is a top view. Fig. 2 is a side view. Fig. 3 is a vertical section.

In the drawings, A represents the nutmeg-grater, having a receptacle, B, for the nutmeg. This grater is removable, so that the nutmeg can be placed in the receptacle B. D is the bowl for the strainer and funnel, to the lower end of which is hinged a rim, $e$, in which is placed a detachable strainer, $f$. Over the rim $e$ is placed the funnel $g$, which, by its peculiar construction, serves the double purpose of a funnel and cake-cutter. To the upper end of the funnel $g$ is a rim, $h$, which rim is used as a cake-cutter, the conductor $l$ serving the purpose of a handle. When the parts are combined as represented in Figs. 2 and 3, the grater A serves as a handle for the utensil.

The advantages of combining the several articles hereinbefore mentioned, viz: grater, funnel, strainer, can-filler, and cake-cutter, in one article will be apparent to the housewife, furnishing her a very useful and cheap household article.

I am aware of the patents to J. Pfeifer and to R. E. Clark, dated January 18, 1876, and July 11, 1876, respectively, and I do not wish to be understood as claiming separately any feature shown therein; but What I do claim as new and useful is—

A compound implement, consisting of the nutmeg-grater A, having a receptacle, B, serving as a handle to the strainer D $f$, funnel $g$ provided with the conductor $l$, and cake-cutter $h$, the several parts being combined and arranged substantially as and for the purpose described.

PETER MELBERT.

Witnesses:
   A. C. JOHNSTON,
   B. L. JOHNSTON.